(12) United States Patent
Lisso

(10) Patent No.: US 11,220,400 B2
(45) Date of Patent: Jan. 11, 2022

(54) MATERIAL STORAGE AND SORTATION SYSTEM

(71) Applicant: Target Brands, Inc., Minneapolis, MN (US)

(72) Inventor: Gregory Lisso, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 255 days.

(21) Appl. No.: 16/657,273

(22) Filed: Oct. 18, 2019

(65) Prior Publication Data

US 2020/0231384 A1 Jul. 23, 2020

Related U.S. Application Data

(60) Provisional application No. 62/793,712, filed on Jan. 17, 2019.

(51) Int. Cl.
*B65G 1/04* (2006.01)
*B65G 1/06* (2006.01)
*B65G 1/137* (2006.01)

(52) U.S. Cl.
CPC ......... *B65G 1/0492* (2013.01); *B65G 1/0414* (2013.01); *B65G 1/0464* (2013.01); *B65G 1/0478* (2013.01); *B65G 1/065* (2013.01); *B65G 1/1375* (2013.01)

(58) Field of Classification Search
CPC .... B65G 1/0478; B65G 1/0414; B65G 1/065; B65G 1/0464; B65G 1/0492
See application file for complete search history.

(56) References Cited

U.S. PATENT DOCUMENTS

| | | | | |
|---|---|---|---|---|
| 5,707,199 | A * | 1/1998 | Faller | E04H 6/24 414/239 |
| 10,294,026 | B1 * | 5/2019 | Lee | B65G 1/065 |
| 10,336,540 | B2 * | 7/2019 | Gravelle | B65G 1/0464 |
| 10,961,054 | B2 * | 3/2021 | Gravelle | B65G 1/065 |
| 2007/0065258 | A1 * | 3/2007 | Benedict | B65G 1/0492 414/266 |
| 2015/0197397 | A1 * | 7/2015 | Razumov | B65G 1/0492 414/279 |
| 2015/0225187 | A1 * | 8/2015 | Razumov | B65G 1/065 414/279 |
| 2017/0129703 | A1 * | 5/2017 | Lindbo | B65G 1/0464 |
| 2018/0111756 | A1 | 4/2018 | Conrad et al. | |
| 2018/0148259 | A1 * | 5/2018 | Gravelle | B65G 1/0464 |
| 2018/0290830 | A1 * | 10/2018 | Valinsky | B65G 1/0435 |
| 2019/0023492 | A1 * | 1/2019 | Voloskov | B65G 1/065 |

(Continued)

OTHER PUBLICATIONS

ATTAbotics "System Overview" Info, Aug. 2017, 50 pages.
(Continued)

*Primary Examiner* — Thomas Randazzo
(74) *Attorney, Agent, or Firm* — Fish & Richardson P.C.

(57) ABSTRACT

Warehouse automation and methods of controlling material flow can be used to streamline order fulfillment processes. For example, according to some embodiments described herein, systems and methods for enhancing automated material handling and storage systems by facilitating multi-level accessibility of materials moving into and out of a three-dimensional storage and retrieval system can be used to enhance the efficiency of warehouses and order fulfillment processes.

15 Claims, 4 Drawing Sheets

(56) References Cited

U.S. PATENT DOCUMENTS

2019/0026687 A1* 1/2019 Voloskov ............. B65G 1/0492
2019/0375590 A1* 12/2019 Gravelle ................. B65G 1/04

OTHER PUBLICATIONS

ATTAbotics "System Overview—Introduction to ATTAbotics Technology—RevOA," 15 pages.
ATTAbotics One Page System Overview, 1 page.

* cited by examiner

MATERIAL STORAGE AND SORTATION SYSTEM

CROSS-REFERENCE TO RELATED APPLICATIONS

This application claims the benefit of U.S. Provisional Application Ser. No. 62/793,712, filed Jan. 17, 2019. The disclosure of the prior application is considered part of (and is incorporated by reference in) the disclosure of this application.

TECHNICAL FIELD

This document relates to systems and methods for enhancing efficiencies of material handling and storage systems. For example, this document relates to systems and methods for enhancing automated material handling and storage systems by facilitating multi-level accessibility of materials moving into and out of a three-dimensional storage and retrieval system.

BACKGROUND

Highly efficient warehousing, item stowage, item picking, order sortation, and shipping processes are on the frontline of meeting high-level customer expectations regarding order fulfillment processes.

The order fulfillment process refers to all the steps companies take from when they receive a customer order (which can include an order that is wholly or partly internal to the company, such as a store replenishment order) until the items are landed in customers' or recipients' hands. Such steps can include, for example: the order is sent to the warehouse; a worker goes into the warehouse, finds the items in the order, and picks the items off the shelf; the order is packed for shipping; the order is shipped.

The use of warehouse automation is one way to increase the efficiency of an order fulfillment process. The goal of automation is to cut out manual steps of the order fulfillment process. Automation technology is useful for at least two reasons: to help reduce the occurrences of human error, and to make order fulfillment processes more efficient.

SUMMARY

This document describes systems and methods for enhancing efficiencies of material handling and storage systems. For example, this document describes systems and methods for enhancing automated material handling and storage systems by facilitating multi-level accessibility of materials moving into and out of a three-dimensional storage and retrieval system.

In one aspect, this disclosure is directed to a three-dimensional (3D) storage system. In some embodiments, the 3D storage system includes multiple storage levels stacked vertically in relation to each other, a top level arranged above an uppermost level of the multiple storage levels, and a bottom level arranged below a lowermost level of the multiple storage levels. Each storage level defines storage cells and open cells. The open cells of each storage level are stacked vertically in relation to each other to define open vertical passageways configured for automated vehicles to travel vertically between the multiple storage levels. The open vertical passageways include peripheral open vertical passageways located at a periphery of the 3D storage structure. The top level comprises an arrangement of upper mechanical members by which the automated vehicles can travel in two dimensions within a top horizontal plane so as to access top ends of the open vertical passageways. The bottom level comprises an arrangement of lower mechanical members by which the automated vehicles can travel in two dimensions within a bottom horizontal plane so as to access bottom ends of the open vertical passageways. The peripheral open vertical passageways are configured to facilitate the automated vehicles to exit, enter, or both exit and enter the 3D storage structure via one or more of the multiple storage levels.

Such a 3D storage system may optionally include one or more of the following features. The open vertical passageways may include interior open vertical passageways that are located in the interior of the 3D storage structure in comparison to the peripheral open vertical passageways. The 3D storage system may also include one or more of the automated vehicles. In some embodiments, each of the one or more automated vehicles is configured to engage and transport a respective storage container. Each of the one or more automated vehicles may include a mechanism for transferring a storage container that is onboard the automated vehicle to a storage cell. The peripheral open vertical passageways may be configured to facilitate the automated vehicles to exit, enter, or both exit and enter the 3D storage structure via each of the multiple storage levels.

In another aspect, this disclosure is directed to another 3D storage system embodiment. The 3D storage system includes multiple storage levels stacked vertically in relation to each other, a plurality of storage containers, a top level arranged above an uppermost level of the multiple storage levels, and a bottom level arranged below a lowermost level of the multiple storage levels. Each storage level defines storage cells and open cells. The open cells of each storage level are stacked vertically in relation to each other to define open vertical passageways configured for automated vehicles to travel vertically between the multiple storage levels. The open vertical passageways include peripheral open vertical passageways located at a periphery of the 3D storage structure. Each storage container configured to be individually received in any one of the storage cells and to be individually transported within the 3D storage structure by any one of the automated vehicles. The top level comprising an arrangement of upper mechanical members by which the automated vehicles can travel in two dimensions within a top horizontal plane so as to access top ends of the open vertical passageways. The bottom level comprising an arrangement of lower mechanical members by which the automated vehicles can travel in two dimensions within a bottom horizontal plane so as to access bottom ends of the open vertical passageways. The peripheral open vertical passageways are configured such that the storage containers can individually exit, enter, or both exit and enter the 3D storage structure via one or more of the multiple storage levels.

Such a 3D storage system may optionally include one or more of the following features. The open vertical passageways may include interior open vertical passageways that are located in the interior of the 3D storage structure in comparison to the peripheral open vertical passageways. The 3D storage system may also include one or more of the automated vehicles. Each of the one or more automated vehicles may be configured to engage and transport a respective storage container. Each of the one or more automated vehicles may include a mechanism for transferring a storage container that is onboard the automated vehicle to a storage cell. The mechanism may also be configured for transferring the storage container that is onboard the automated vehicle to exit the 3D storage structure via one or more of the multiple storage levels. The peripheral open vertical passageways may be configured to facilitate the storage containers to exit, enter, or both exit and enter the 3D storage structure via each of the multiple storage levels.

In another aspect, this disclosure is directed to a method of stowing and retrieving storage containers using automated vehicles operating in a 3D storage structure. The method includes: (i) transporting, by a first automated vehicle, a storage container within the 3D storage structure; (ii) placing, using the first automated vehicle, the storage container into a first storage cell of the 3D storage structure; (iii) retrieving, using a second automated vehicle, the storage container from the first storage cell; (iv) transporting, by the second automated vehicle, the storage container from the first storage cell to a peripheral open vertical passageway; and (v) while the second automated vehicle and the storage container are at the peripheral open vertical passageway, transferring the storage container out of the 3D storage structure from one of the multiple storage levels. In some embodiments, the 3D storage structure includes multiple storage levels stacked vertically in relation to each other. Each storage level defines storage cells and open cells. The open cells of each storage level are stacked vertically in relation to each other to define open vertical passageways configured for the automated vehicles to travel vertically between the multiple storage levels. The open vertical passageways include peripheral open vertical passageways located at a periphery of the 3D storage structure.

Such a method of stowing and retrieving storage containers using automated vehicles operating in a 3D storage structure may optionally include one or more of the following features. In some embodiments, the method also includes inducting the storage container into the 3D storage structure via a particular one of the peripheral open vertical passageways and at a particular one of the multiple storage levels.

The systems and processes described here may be used to provide one or more of the following optional benefits. First, some embodiments provide an inventory storage and retrieval process that is more efficient, responsive, and agile so orders can be shipped to internal and external customers in a shorter timeframe than current processes. Such a result can be accomplished, for example, through optimizing material flow by reducing material handling, storage, and delays related to stowing and retrieving inventoried items. Second, inventory carrying costs can be reduced by the added efficiencies provided by the systems and processes described herein. Third, in some cases warehouse space requirements can be reduced using the automated systems and processes described herein.

Other features, aspects and potential advantages will be apparent from the accompanying description and figures.

DESCRIPTION OF DRAWINGS

FIG. 4 also shows adjacent conveyance systems by which automated vehicles and/or storage containers can enter and/or exit the automated material handling and storage system.

Like reference symbols in the various drawings indicate like elements

DETAILED DESCRIPTION

This document describes systems and methods for enhancing efficiencies of material handling and storage systems. For example, this document describes systems and methods for enhancing automated material handling and storage systems by facilitating multi-level accessibility of materials moving into and out of a three-dimensional storage and retrieval system. In some embodiments, the systems described herein can also be used for order sortation, in addition to material storage. Accordingly, as the processing time of handling inventoried items is reduced using multi-level accessibility as described herein, the overall efficiency of material storage/handling and order fulfillment processes is substantially increased.

Figure 1:
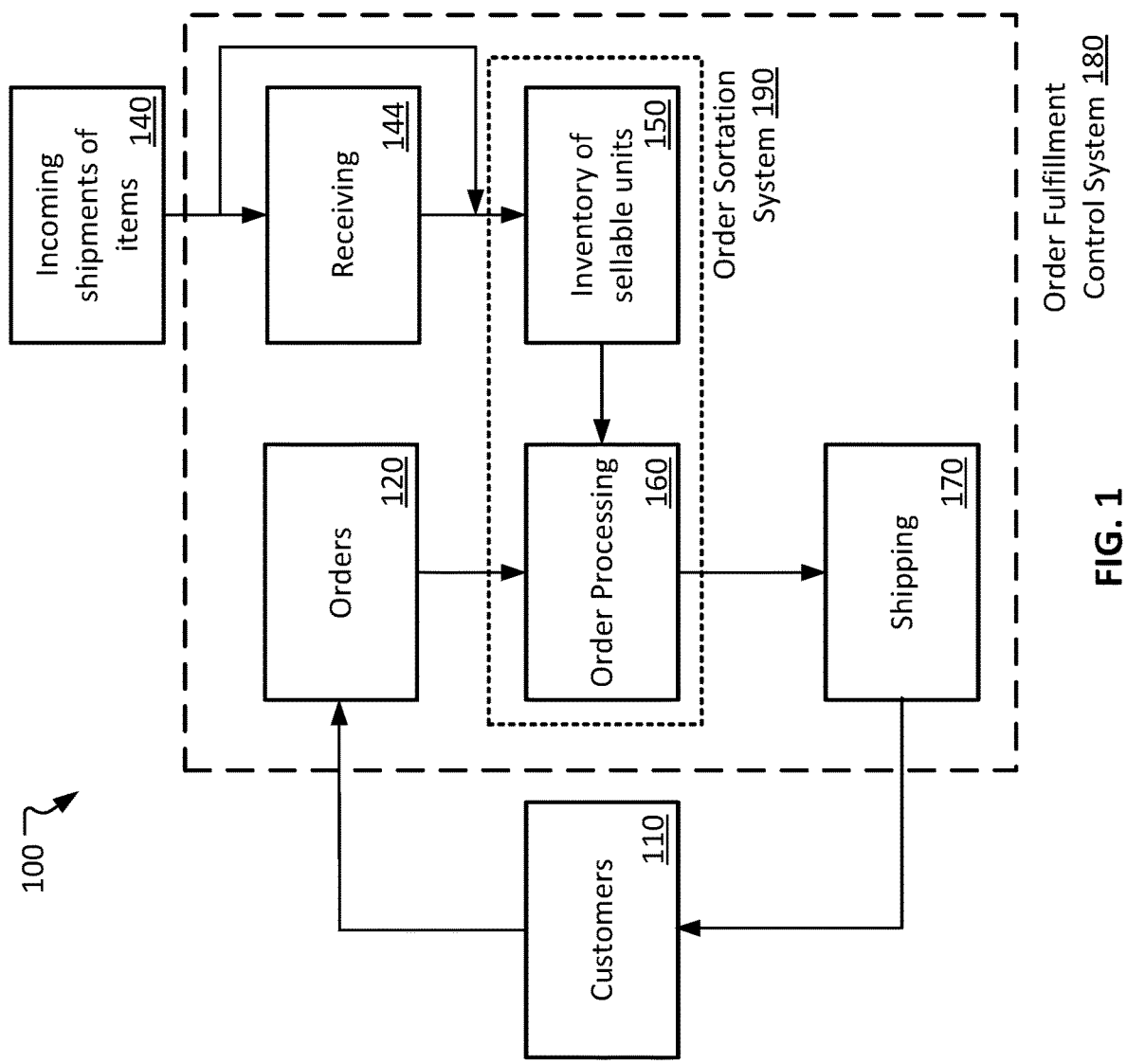
FIG. 1 is a highly-simplified schematic diagram showing the material and information flow of a basic order fulfillment process.

FIG. 1 depicts a highly-simplified schematic diagram illustrating an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In some examples, the order fulfillment process 100 takes place at a single facility. Alternatively, in some examples execution of the order fulfillment process 100 is distributed across two or more facilities. The order fulfillment process 100 as described herein can be a portion of a multi-echelon supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in an efficient, timely, and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on.

For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of sellable items 140 arrive at the facility. In some cases, the incoming shipments of items 140 are processed by receiving 144 (e.g., for the performance of quality control inspections, quantity confirmations/reconciliations, inventory/order control system transactions, etc.). Afterwards, the items enter into storage inventory 150 of the facility as sellable units. In some cases, some incoming items go directly from receiving 144 into storage inventory 150 (e.g., if the incoming items were transferred in from an affiliated facility at which the items were already accounted for in the inventory system). The types and quantities of the incoming sellable items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable items in the inventory of sellable units 150 can be stored in various types of containers or receptacles such as, but not limited to, boxes, totes, trays, cartons, cases, pallets, baskets, bins, bags, and the like, and combinations thereof. In some implementations, a decantation process takes place prior to moving the sellable units into storage inventory 150. That is, in some implementations sellable units can be removed from an as-received bulk container or packaging and placed in a different type of container for storage and retrieval. In some such implementations, the sellable units are individually put into a storage container. In some embodiments, a particular prescribed number of sellable units are put into a storage container. The storage container can be a specific design that is compatible with an automated storage and retrieval system in some examples. For example, in some examples a specific type of storage tote can be used, and sellable items are decanted from their shipment packaging and placed into the specific storage tote prior to entry into the inventory of sellable units 150.

The sellable units in storage inventory 150 can be contained in various types of storage accommodations such as racks, shelves, containers, vessels, carts, pallet lanes, and the like, and combinations thereof. Such storage accommodations can be individually identified and tracked by the control system 180. That is, the control system 180 can be used to keep track of the quantities in stock of the various sellable items in the inventory 150 and of the inventory location(s) of the various sellable items in the inventory 150.

In some embodiments, the sellable units in storage inventory 150 are stored in one or more automated material handling and storage systems. The systems of FIGS. 2 and 3 described below are examples of such automated material handling and storage systems.

Next, in the step of order processing 160, the sellable item(s) included in the customer order 120 are compiled in preparation for shipment to the respective customer 110. To fulfill the customer orders 120, the one or more items specified in each order may be retrieved (e.g., manually, automatically, or a combination thereof) from storage inventory 150. In some embodiments, retrieved sellable items may be transported, delivered or conveyed to one or more order processing areas in the flow center for sorting and assembling into one or more outbound shipping containers for the fulfillment of a respective customer order 120. In some embodiments, the order processing area can be connected to, or adjacent to, the system used for the storage inventory 150. Outbound shipping containers containing the ordered sellable items are then transported to shipping 170, and then to customers 110 to complete the order-fulfillment process 100.

The combination of the storage inventory 150 and the order processing 160 areas can be referred to as an order sortation system 190. In some embodiments, various types of automation (such as mobile robots, automated vehicles, etc.) are used to automate the order sortation system 190. For example, in some embodiments mobile robots are used to automate the transfer of ordered sellable items to, from, and within the system for storage inventory 150 in an efficient manner.

Order fulfillment process 100 can include the daily replenishment and movement of inventory generated from real-time demand singles for in-store retail sales and direct-to-customer on-line sales fulfilled from a multi-echelon inventory holding model at the correct unit of measure, using fast and easy material handling equipment that will create operational efficiency at every process step in the supply chain. It should be understood that order fulfillment process 100 allows multiple types of orders 120 to be processed and fulfilled using the same (or essentially the same) order fulfillment process 100. For example, direct-to-customer shipments, store replenishment orders, customer pick-up-at-store orders, forward deployment of inventory shipments, inventory transfers (e.g., proactive inventory transfers, reactive inventory transfers), and the like can be processed and fulfilled using essentially the same order fulfillment process 100. Hence, the order fulfillment process 100 can be considered as a type of omni-channel order fulfillment process.

FIG. 1 and the foregoing description of the order fulfillment process 100 has provided a high-level overview of the operations of a flow center. Next, in reference to FIG. 2, additional detail focused particularly on the steps of inventory of sellable units 150 and order processing 160 will be provided.

Figure 2:
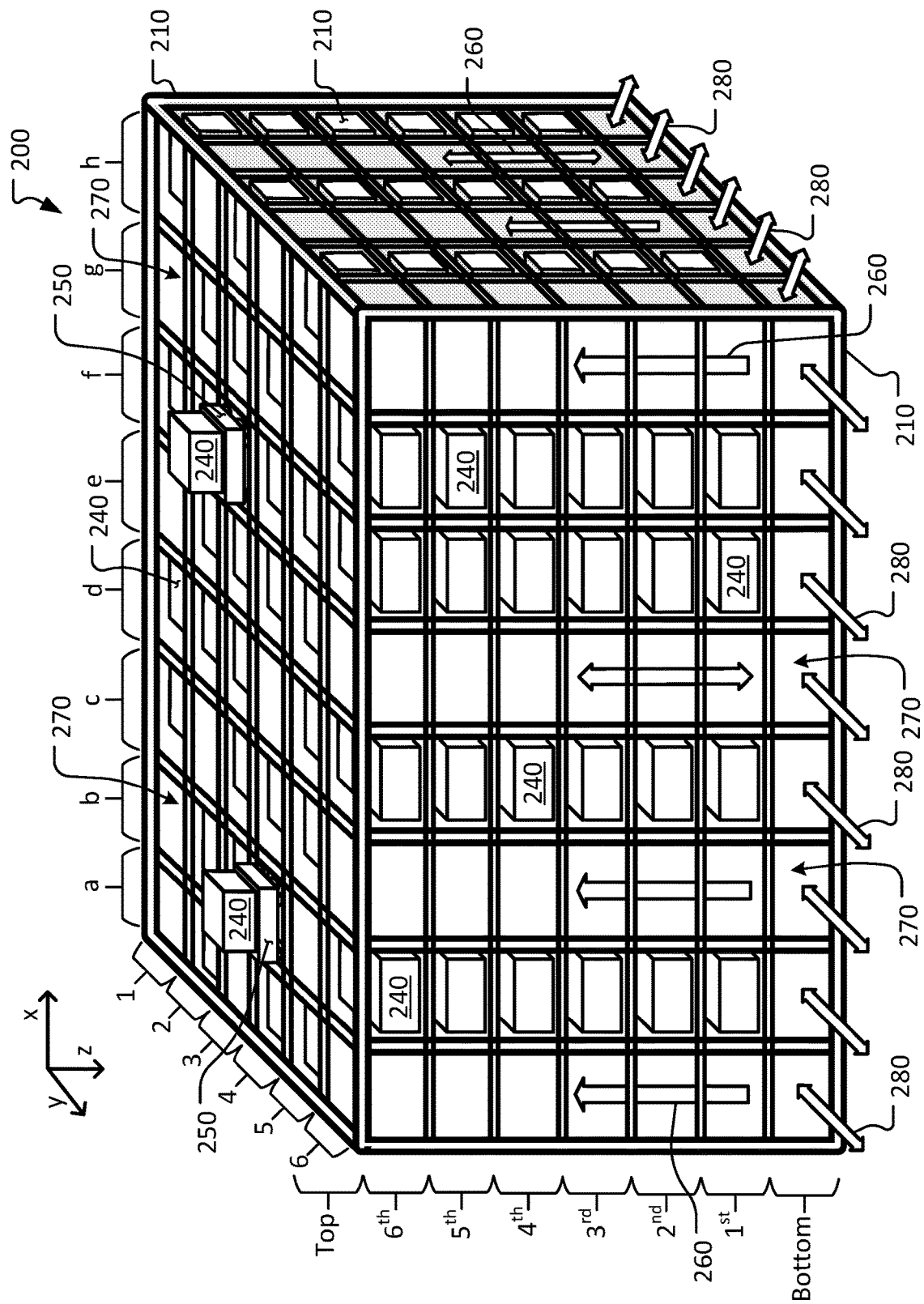
FIG. 2 is a perspective view of an example automated material handling and storage system.

Referring also to FIG. 2, an example material handling and storage system 200 can be used as the system for storage inventory 150 and/or order sortation 190. In some embodiments, system 200 can be used for both storage inventory 150 and order processing 160. Accordingly, in some embodiments the material handling and storage system 200 can be used as an order sortation system 190 (or at least as a part of an order sortation system 190), as described above.

The example material handling and storage system 200 is a multi-level, three-dimensional storage structure 210 (as indicated by the "x-y-z axes" label) that can store inventories of items in storage containers 240. For example, in the depicted non-limiting example embodiment, the material handling and storage system 200 includes six levels of storage (as labeled "$1^{st}$" through "$6^{th}$" along the left side of the storage structure 210, vertically along the "z-axis"). Of course, it should be understood that the system 200 is scalable such that fewer or more than six levels of storage can be facilitated using the concepts provided herein without departing from the inventive scope of this disclosure.

As described further below, in addition to the six levels of storage, the material handling and storage system 200 has a bottom level and a top level (as labeled along the left side of the storage structure 210). The bottom and top levels can be used to facilitate horizontal movement (within the respective "x-y" planes of the bottom and top levels) of storage containers 240 by automated vehicles 250 that can transport individual storage containers 240 within the storage structure 210. Such automated vehicles 250 of the material handling and storage system 200 can be configured to travel horizontally (in "x" and "y" directions) along mechanical members of the storage structure 210 such as rails, tracks, gear racks, and the like, while carrying a storage container 240.

Moreover, the automated vehicles 250 of the material handling and storage system 200 can be configured to travel vertically (in the "z" direction) along mechanical members of the storage structure 210 such as rails, tracks, gear racks, and the like, while carrying a storage container 240. The vertical travel, as depicted by vertical arrows 260, can take place along open vertical passageways 270 that are interspersed within the storage structure 210 at various x-y locations around the periphery and internally. The open vertical passageways 270 are a series of open cells that extend between the bottom and top levels. Some of the open vertical passageways 270 accommodate only upward travel of the automated vehicles 240, while other open vertical passageways 270 accommodate both upward and downward travel of the automated vehicles 240. Accordingly, the automated vehicles 250 can travel in the "x" and "y" directions at the top and bottom levels, and in the "z" direction along the open vertical passageways 270.

The automated vehicles 250 can access the storage cells of the storage structure 210 by traveling in the "x" and "y" directions at the top and bottom levels, and in the "z" direction along the open vertical passageways 270. At any particular storage cell within the storage structure 210, an automated vehicle 250 can stow a storage container 240 into an open storage cell and/or obtain a storage container 240 from a storage cell. For example, a control system (e.g., the order fulfillment and control system 180 described above, a fleet management system, and/or the like) can cause an automated vehicle 250 carrying a storage container 240 to move on the top level so that it becomes located in the "d-4" location on the top level. Then, the automated vehicle 250 carrying the storage container 240 can be controlled to descend the open vertical passageway 270 at the "d-4" location. At any level ("$1^{st}$" through "$6^{th}$") along the open vertical passageway 270 at the "d-4" location, the automated vehicle 250 carrying the storage container 240 can be controlled to stop and then to stow the storage container 240 in an adjacent open storage cell (e.g., in an open storage cell in "d-3," "d-5," "c-4," or "e-4").

In a similar manner, an automated vehicle 250 can be controlled to obtain a particular storage container 240 from a particular storage cell. For example, an automated vehicle 250 that is not carrying a storage container 240 can be controlled to maneuver on the top level to an open vertical passageway 270 that is adjacent to the particular storage cell where the particular storage container 240 is stored. The automated vehicle 250 can then be controlled to descend the open vertical passageway 270 and to stop on the appropriate level so as to access the particular storage container 240. The automated vehicle 250 can then couple to the particular storage container 240, and then finish its descent to the bottom level. The bottom level of the storage structure 210 is open so that the automated vehicles 250 can move around in the x-y plane.

In order to gain access to items stored in a storage container 240, an automated vehicle 250 transporting the storage container 240 on the bottom level will travel to a peripheral cell on the bottom level. In the depicted embodiment, the storage structure 210 is configured such that the automated vehicles 250 with an on-board storage container 240 can exit (and/or enter) the storage structure 210 at the peripheral cells on the bottom level, as indicated by the arrows 280. Therefore, to provide access to items stored in a storage container 240, an automated vehicle 250 transporting the storage container 240 will exit from the storage structure 210 (as shown) and enter another adjacent structure and/or conveyance mechanism that is configured to allow manual or robotic access into the storage container 240. When such access has been attained (to remove one or more items from the storage container 240, and/or to place one or more items into the storage container 240), then the automated vehicle 250 transporting the storage container 240 can re-enter the storage structure 210 via a peripheral cell on the bottom level.

When the automated vehicle 250 transporting the storage container 240 has re-entered the storage structure 210 via a peripheral cell on the bottom level, then the automated vehicle 250 transporting the storage container 240 can ascend to the top level via a peripheral open passageway 270 (as depicted by arrows 260).

In the depicted embodiment, storage structure 210 only allows automated vehicles 250 to enter and exit the storage structure 210 at the bottom level. That is, automated vehicles 250 are unable to enter and exit the storage structure 210 at any level other than the bottom level. Said another way, automated vehicles 250 cannot exit and/or enter the storage structure 210 at the $1^{st}$ level, the $2^{nd}$ level, the $3^{rd}$ level, the $4^{th}$ level, the $5^{th}$ level, the $6^{th}$ level, or the top level.

Figure 3:
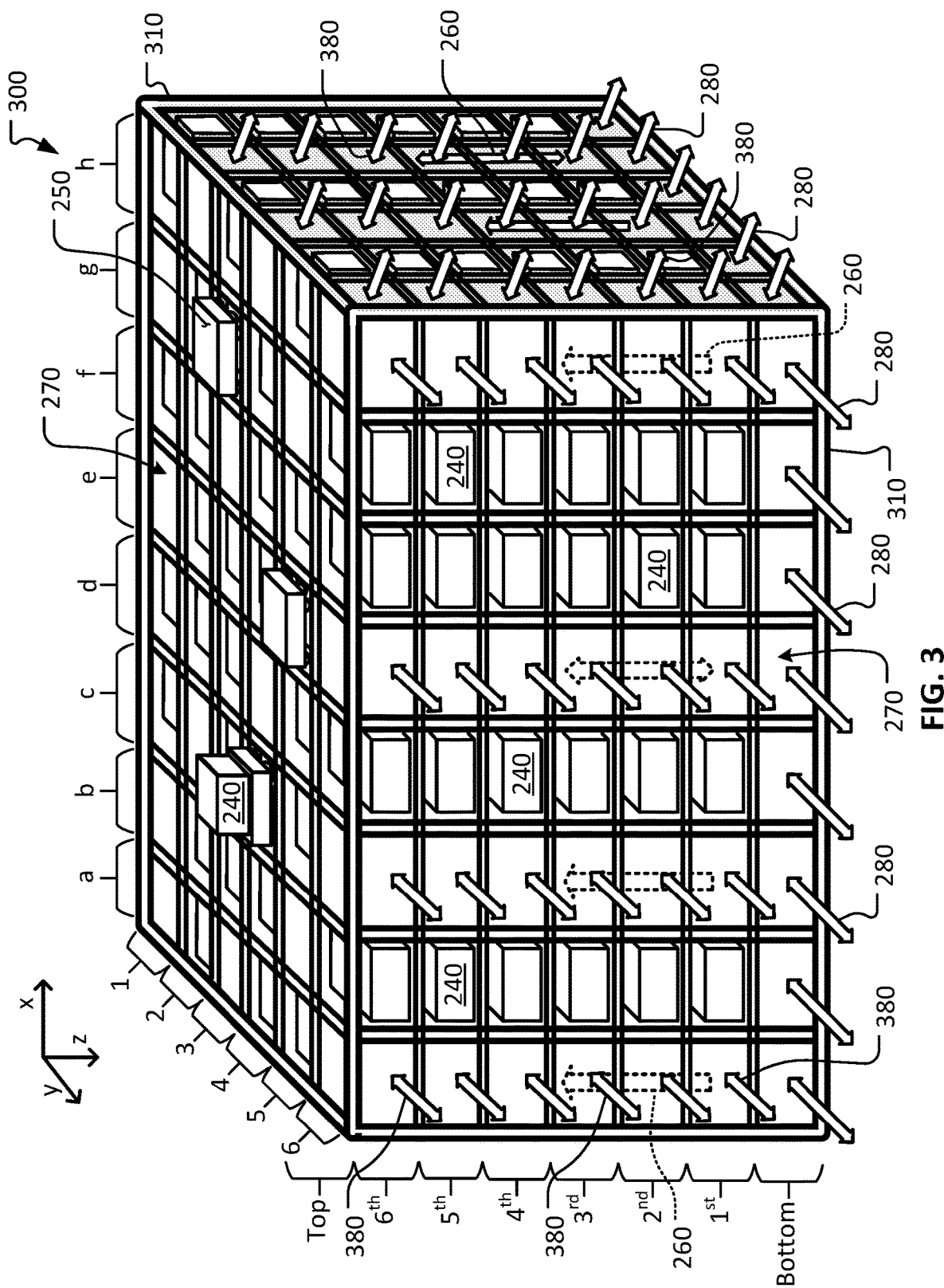
FIG. 3 is a perspective view of another example automated material handling and storage system.

Referring also to FIG. 3, another example material handling and storage system 300 can be used as the system for storage inventory 150 and/or order sortation 190. The material handling and storage system 300 includes much of the structure and functionality of the material handling and storage system 200, and like elements are numbered the same as the material handling and storage system 200. However, the material handling and storage system 300 is enhanced in comparison to the material handling and storage system 200 in that the storage structure 310 allows automated vehicles 250 to enter and/or exit the storage structure 210 at various levels in addition to just the bottom level. That is, automated vehicles 250 are able to enter and/or exit the storage structure 310 at one or more levels in addition to the bottom level. In the depicted embodiment, automated vehicles 250 can exit and/or enter the storage structure 310 at the $1^{st}$ level, the $2^{nd}$ level, the $3^{rd}$ level, the $4^{th}$ level, the $5^{th}$ level, and the $6^{th}$ level, as depicted by arrows 380.

Figure 4:
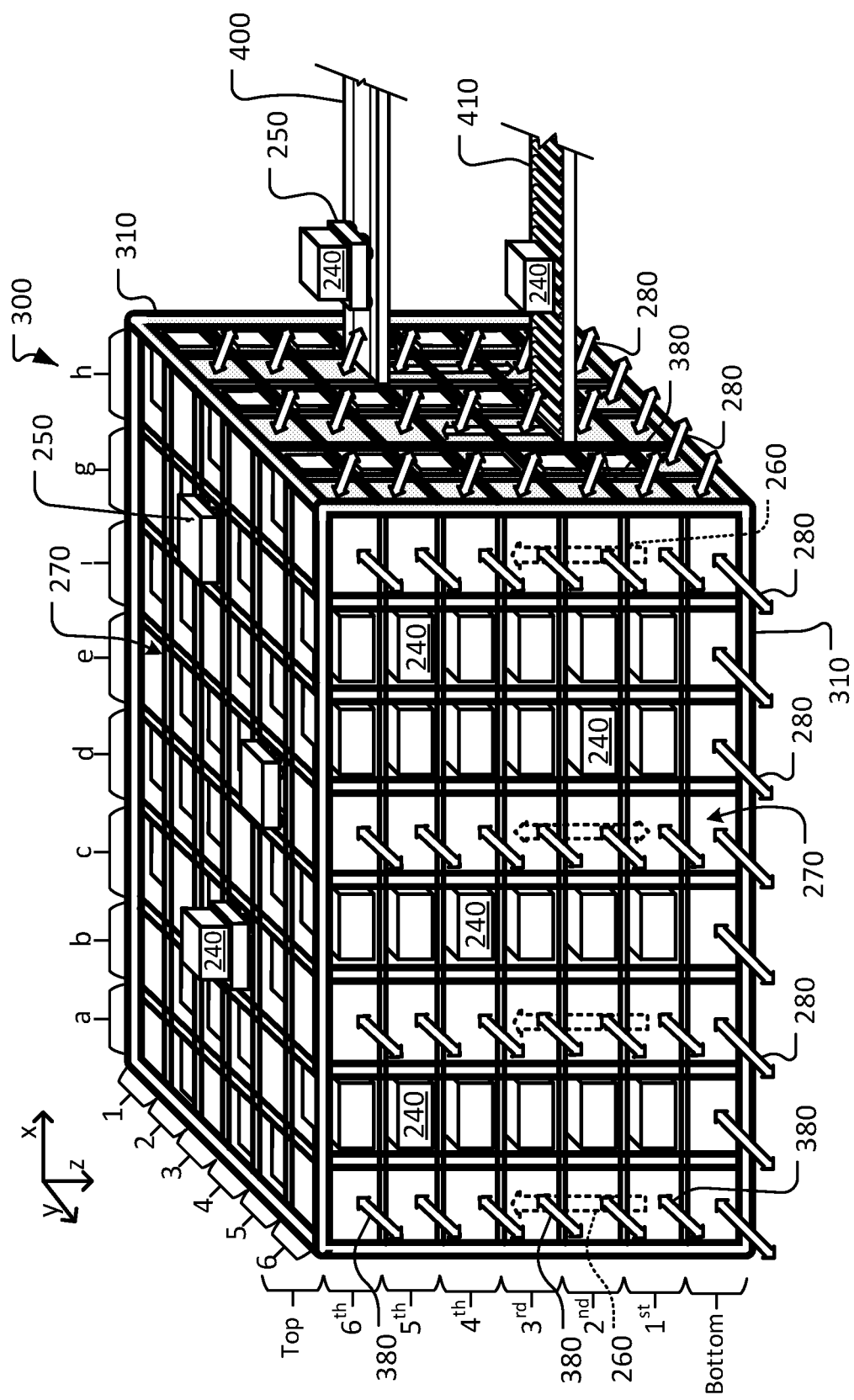
FIG. 4 is another perspective view of the automated material handling and storage system of FIG. 3.

As depicted in FIG. 4, in some embodiments, the automated vehicles 250 can themselves (with or without an onboard storage container 240) exit and/or enter the storage structure 310 at the various levels of the storage structure 310. In such a case, the automated vehicles 250 can travel along mechanical members 400 such as rails, tracks, gear racks, and the like, extending away from, or along a periphery of, the storage structure 310.

Also as depicted in FIG. 4, in some embodiments, the automated vehicles 250 do not themselves exit and/or enter the storage structure 310 at the various levels of the storage structure 310, but instead storage containers 240 are transferred from/to the automated vehicles 250 from their location at a particular level of a peripheral open vertical passageway. In one such example, a conveyor 410 can be located adjacent the periphery of the storage structure 310 and an automated vehicle 250 with an onboard storage container 240 can transfer the storage container 240 onto the conveyor 410. In that example, the storage containers 240 are transferred to/from the storage structure 310 at various levels of the storage structure in addition to the bottom level, while the automated vehicles 250 do not themselves exit the storage structure 310 at the various levels.

The automated vehicles 250 and/or the storage containers 240 can exit/enter the storage structure 310 onto/from various types of material handling equipment and systems such as, but not limited to, conveyors, flow rack, workstations, shuttles, ASRS vehicles/systems, sorters, and the like. It should be understood that storage containers 240 can be inducted into the storage structure 310 using the same concepts and physical equipment. Induction storage containers 240 into the storage structure 310 is just the reverse process of outputting storage containers 240 from the storage structure 310.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A three-dimensional (3D) storage system, comprising: multiple storage levels stacked vertically in relation to each other, each storage level defining storage cells and open cells, the open cells of each storage level stacked vertically in relation to each other to define open vertical passageways configured for automated vehicles to travel vertically between the multiple storage levels, the open vertical passageways including peripheral open vertical passageways located at a periphery of the 3D storage structure;
a top level arranged above an uppermost level of the multiple storage levels, the top level comprising an arrangement of upper mechanical members by which the automated vehicles can travel in two dimensions within a top horizontal plane so as to access top ends of the open vertical passageways; and
a bottom level arranged below a lowermost level of the multiple storage levels, the bottom level comprising an arrangement of lower mechanical members by which the automated vehicles can travel in two dimensions within a bottom horizontal plane so as to access bottom ends of the open vertical passageways, wherein the peripheral open vertical passageways are configured to facilitate the automated vehicles to exit, enter, or both exit and enter the 3D storage structure at one or more of the multiple storage levels, the multiple storage levels comprising mechanical members extending away from the periphery of the 3D storage structure.

2. The 3D storage system of claim 1, wherein the open vertical passageways includes interior open vertical passageways that are located in the interior of the 3D storage structure in comparison to the peripheral open vertical passageways.

3. The 3D storage system of claim 1, wherein the peripheral open vertical passageways are configured to facilitate the automated vehicles to exit, enter, or both exit and enter the 3D storage structure at each of the multiple storage levels.

4. The 3D storage system of claim 1, further comprising one or more of the automated vehicles.

5. The 3D storage system of claim 4, wherein each of the one or more automated vehicles is configured to engage and transport a respective storage container.

6. The 3D storage system of claim 5, wherein each of the one or more automated vehicles includes a mechanism for transferring a storage container that is onboard the automated vehicle to a storage cell.

7. A three-dimensional (3D) storage system, comprising: multiple storage levels stacked vertically in relation to each other, each storage level defining storage cells and open cells, the open cells of each storage level stacked vertically in relation to each other to define open vertical passageways configured for automated vehicles to travel vertically between the multiple storage levels, the open vertical passageways including peripheral open vertical passageways located at a periphery of the 3D storage structure;
a plurality of storage containers, each storage container configured to be individually received in any one of the storage cells and to be individually transported within the 3D storage structure by any one of the automated vehicles;
a top level arranged above an uppermost level of the multiple storage levels, the top level comprising an arrangement of upper mechanical members by which the automated vehicles can travel in two dimensions within a top horizontal plane so as to access top ends of the open vertical passageways; and
a bottom level arranged below a lowermost level of the multiple storage levels, the bottom level comprising an arrangement of lower mechanical members by which the automated vehicles can travel in two dimensions within a bottom horizontal plane so as to access bottom ends of the open vertical passageways, wherein the peripheral open vertical passageways are configured such that the storage containers can be transferred to individually exit, enter, or both exit and enter the 3D storage structure at one or more of the multiple storage levels, the multiple storage levels comprising one or more conveyors located adjacent to, and extending away from, the periphery of the 3D storage structure.

8. The 3D storage system of claim 7, wherein the open vertical passageways includes interior open vertical passageways that are located in the interior of the 3D storage structure in comparison to the peripheral open vertical passageways.

9. The 3D storage system of claim 7, wherein the peripheral open vertical passageways are configured to facilitate the storage containers to exit, enter, or both exit and enter the 3D storage structure at each of the multiple storage levels.

10. The 3D storage system of claim 7, further comprising one or more of the automated vehicles.

11. The 3D storage system of claim 10, wherein each of the one or more automated vehicles is configured to engage and transport a respective storage container.

12. The 3D storage system of claim 11, wherein each of the one or more automated vehicles includes a mechanism for transferring a storage container that is onboard the automated vehicle to a storage cell.

13. The 3D storage system of claim 12, wherein the mechanism is also configured for transferring the storage container that is onboard the automated vehicle to exit the 3D storage structure at one or more of the multiple storage levels.

14. A method of stowing and retrieving storage containers using automated vehicles operating in a three-dimensional (3D) storage structure, the method comprising:
transporting, by a first automated vehicle, a storage container within the 3D storage structure;
placing, using the first automated vehicle, the storage container into a first storage cell of the 3D storage structure, the 3D storage structure comprising:
multiple storage levels stacked vertically in relation to each other, each storage level defining storage cells and open cells, the open cells of each storage level stacked vertically in relation to each other to define open vertical passageways configured for the automated vehicles to travel vertically between the multiple storage levels, the open vertical passageways including peripheral open vertical passageways located at a periphery of the 3D storage structure;
retrieving, using a second automated vehicle, the storage container from the first storage cell;
transporting, by the second automated vehicle, the storage container from the first storage cell to a peripheral open vertical passageway; and
while the second automated vehicle and the storage container are at the peripheral open vertical passageway, transferring the storage container out of the 3D storage structure from one of the multiple storage levels, the multiple storage levels comprising a conveyor located adjacent to, and extending away from, the periphery of the 3D storage structure.

15. The method of claim 14, further comprising inducting the storage container into the 3D storage structure via a particular one of the peripheral open vertical passageways and at a particular one of the multiple storage levels.

* * * * *